Max Haeberlein
INVENTOR

July 15, 1947. M. HAEBERLEIN 2,424,028
BEARING
Filed July 1, 1943 3 Sheets-Sheet 2

Max Haeberlein
INVENTOR
BY
ATTORNEY

July 15, 1947.                M. HAEBERLEIN                2,424,028
                                  BEARING
              Filed July 1, 1943                   3 Sheets-Sheet 3

Max Haeberlein
INVENTOR
BY
ATTORNEY

Patented July 15, 1947

2,424,028

UNITED STATES PATENT OFFICE 2,424,028

BEARING

Max Haeberlein, Maplewood, N. J., assignor to Worthington Pump and Machinery Corporation, Harrison, N. J., a corporation of Delaware Application July 1, 1943, Serial No. 492,979

4 Claims. (Cl. 308—73)

This invention relates to bearings, and more particularly to the segment type wherein tapered films of lubricant are produced between the relatively moving surfaces of the bearing.

Bearings of the loose segment type are difficult to maintain in good operating condition. Levelling plates and other segment adjusting devices have been employed in order to maintain proper distribution of the load with respect to all the loose segments. All such adjusting devices are costly and difficult to maintain in such condition of adjustment as to assure formation of the essential films of tapered lubricant. An ample supply of lubricant is essential, and it frequently happens that the adjusting devices are so arranged in the bearing as to hinder the proper distribution of the lubricant.

An object of the present invention is to provide a bearing of durable and simple construction, wherein a bearing element proper is formed with segments flexibly and integrally connected therewith in which the segments operate in such manner, without the aid of adjusting devices, as to maintain proper and permanent distribution of the total load to all the segments and wherein novel means are incorporated to maintain an ample supply of lubricant about the relatively moving bearing surfaces in such manner as to eliminate excessive agitation of the lubricant and consequent forming thereof.

Another object is to provide a thrust bearing of the segment type wherein the bearing proper is supported in a novel seat of such construction as to permit self-aligning of the bearing and its shaft or journal with respect to the bearing support.

Another object is to provide a combination radial and thrust bearing, wherein the thrust bearing includes a bearing element having segments integrally and flexibly connected therewith, in which the thrust and radial units are arranged in a compact unit of simple and durable construction, and in which a single seat is provided to permit self-aligning of both the thrust and radial bearing and their common shaft or journal with respect to their bearing support.

With these and other objects in view, as may appear from the accompanying specification, the invention consists of various features of construction and combination of parts, which will be first described in connection with the accompanying drawings, showing a bearing of a preferred form embodying the invention, and the features forming the invention will be specifically pointed out in the claims.

Figure 1:
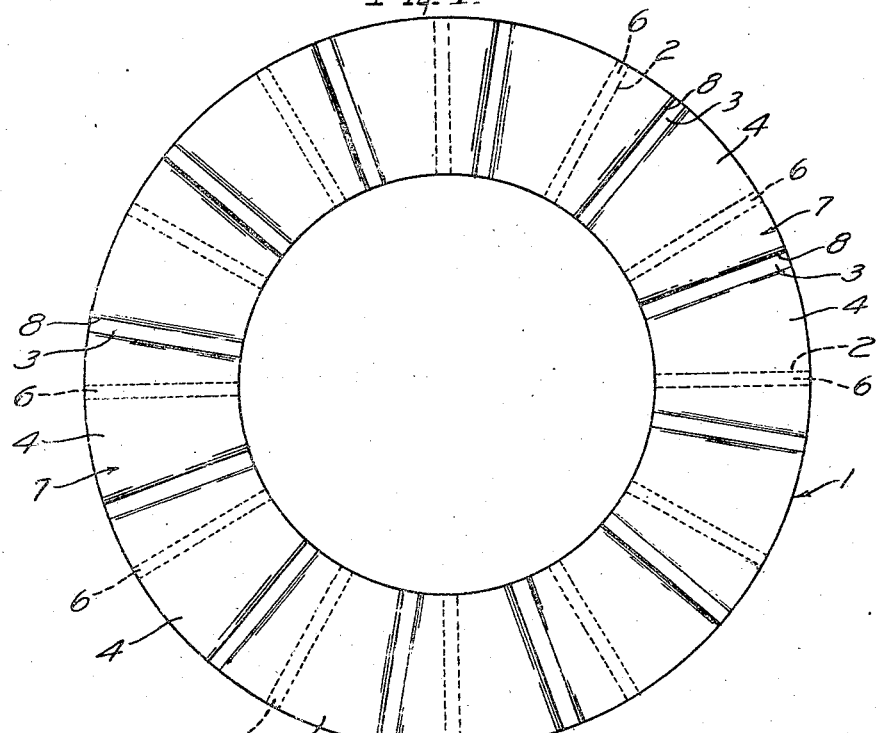
Figure 1 is a face view of a thrust bearing element provided with segments in accordance with the invention.
Figure 2:
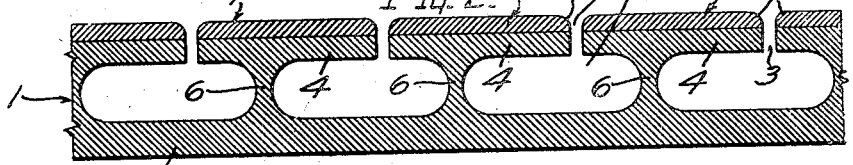
Figure 2 is a sectional development of a portion of the thrust bearing element.
Figure 3:
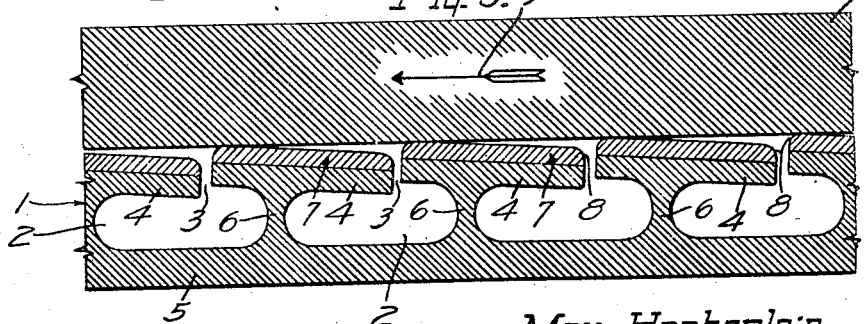
Figure 3 is a view similar to Figure 2 but illustrating the action of the segments with respect to their associated thrust collar to provide wedge shaped films of lubricant between the relatively moving parts.

Referring to Figures 1, 2, and 3 which illustrate the principle of operation of the wedge film producing structure, Figure 1 indicates a thrust bearing element in the nature of an annular body provided with radial chambers or passages 2. These passages lie intermediate the end faces of the collar, and one end face of the collar is provided with radial cuts 3 to divide the collar into a plurality of segments 4. These segments are integrally connected with the uncut portion 5 of the collar by radial webs 6. The webs 6 are relatively thin and flexibly connect the segments 4 with the portion 5.

The thrust collar associated with the bearing element 1 is indicated at 6'. Antifriction liners 7 are attached to the segments 4, which liners have pressure engagement with one face of the collar 6'. All the liners are rounded at 8 along the radial edges to facilitate the entry of lubricant between the bearing faces of the liners and the collar 6'. Figures 2 and 3 illustrate the webs 6 as being located to one side of the centerlines of the respective segments 4. However, the webs 6 may be located on the centerlines of the respective segments 4. In a construction such as that shown in Figures 2 and 3, the thrust collar 6' rotates in the direction of the arrow 9. Because of the flexibility of the webs 6, any eccentric force effective on the segments 4 tends to tilt the segments in a slight degree. Lubricant drawn in between the segments and the collar takes the form of wedges tapering toward the trailing edges of the segments. The tapered lubricant or oil film is under maximum pressure near the center of the loaded areas of the segments, and, owing to the eccentric pressure effective on the segments, the tapered contour of the lubricant film is maintained under thrust loads. The wedge oil films assure complete oil films over the entire bearing faces of the segments. Similar tapered films of lubricant are produced in segments having their connecting webs located centrally thereof.

Figure 4:
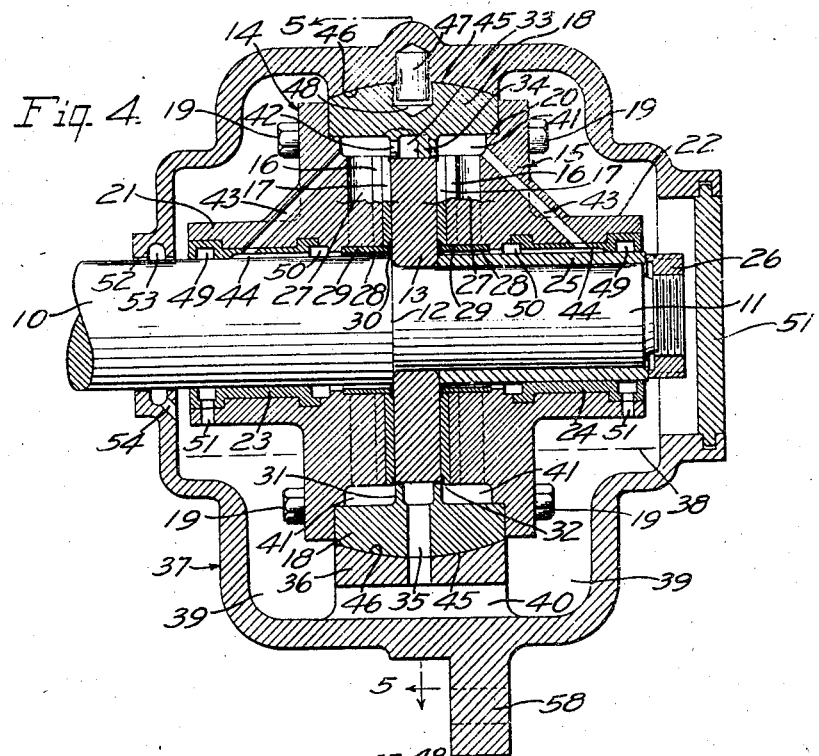
Figure 4 is an axial sectional view of a combination radial and thrust bearing, with the shaft or journal illustrated in elevation.
Figure 5:
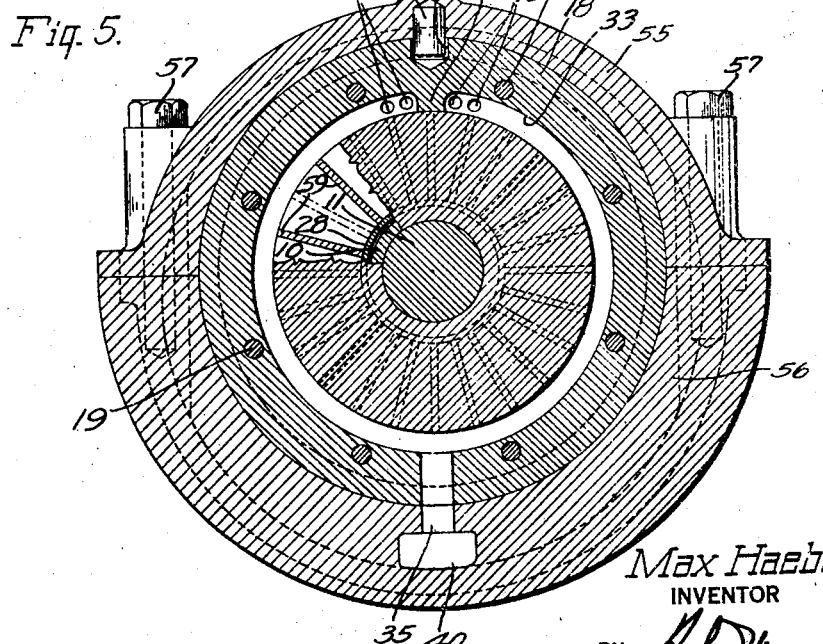
Figure 5 is a sectional view taken along the line 5—5 of Figure 4, with a portion broken away for the purpose of illustration.

Figures 4 and 5 illustrate a combination radial and thrust bearing, wherein the shaft or journal 10 is provided with a co-axial pin 11 of smaller diameter than the shaft to provide an annular shoulder 12. Upon the pin 11 is mounted a thrust collar 13. The collar has face engagement with the shoulder 12 and may be shrunk upon the pin 11 to fixedly relate the collar and the pin. The collar 13 is located between two thrust bearing elements 14 and 15. Both elements 14 and 15 are provided with segments 16 which bear against the two end faces of the collar. The segments 16 are provided with antifriction liners 17 for engagement with the collar 13, and segments 16 are arranged radially in conformity with Figure 1.

Both elements 14 and 15 are fixed to an annular seat member 18 by bolts 19. Annular shoulders 20 on the elements 14 and 15 engage inside the seat member 18 to maintain the seat member concentrically with the axes of the elements 14 and 15.

Radial bearings 21 and 22 are integrally connected with the elements 14 and 15 respectively. The bearings 21 and 22 are co-axial and of like diameters. An antifriction liner 23 is provided in the bearing 21 for bearing engagement with the shaft 10. A similar bearing liner 24 is provided inside the bearing 22, but the liner 24 has bearing engagement with a sleeve 25 mounted on the pin 11. The shaft 10 and the sleeve 25 are of like outside diameters, which renders the elements 14 and 15 interchangeable. A nut 26 is threaded on one end of the pin 11 to clamp the sleeve 25 against the collar 13, this collar being confined between the shoulder 12 and the sleeve 25.

The inner ends of the passages 27 are substantially closed by rings 28 pressed into bores 29 in the respective elements 14 and 15. A slight clearance is provided between the rings 28 and the respective shaft 10 and sleeve 25, but the rings terminate slightly short of the bearing faces of the liners 17 to provide lubricant-passing clearances 30 adjacent the end faces of the collar 13.

The collar 13 lies in the plane of a flange 31 on the seat member 18. A slight clearance 32 is provided between the peripheral face of the collar 13 and the flange 31. An oil groove or passage 33 is provided in the peripheral face of the flange 31, the ends of the groove 33 being separated by a wall 34 located vertically of the axis of the collar 13. A lubricant passage 35 is provided in the seat member 18 and a second seat member 36 which supports the seat member 18. The seat member 36 is in the nature of a flange fixed to a housing 37 which constitutes an enclosure for the bearing structure. The seat member 36 is eccentrically positioned with respect to the axis of the housing 37 to elevate the bearing structure in the housing. This arrangement provides ample room for a large quantity of lubricant, the lubricant having a normal level indicated at 38 in Figure 4. Communication between the chambers 39 in the housing 37 and the passage 35 is established through the medium of a cross passage 40 extending horizontally through the seat member 36 adjacent the bottom wall structure of the housing 37.

The two elements 14 and 15 are shaped to provide lubricant passages 41 on opposite sides of the flange 31. Ports 42 place the groove 33 in communication with the passages 41, the ports being located closely adjacent the wall 34. Declining lubricant passages 43 in the elements 14 and 15 place the passages 41 in communication with axial lubricant grooves 44 in the respective liners 23 and 24.

The seat member 18 is provided with a bearing face 45 comprising a portion of a sphere, this face engaging a correspondingly shaped face 46 on the seat member 36. A key pin 47 is fixed to the flange 36 and is loosely receivable in a depression 48 in the seat member 18. While the pin 47 restrains the seat member 18 from relative rotation with respect to the seat chamber 36, the pin 47 may shift a slight amount relatively to the seat member 18 to permit the latter and the connected elements 14 and 15 to shift relatively to the housing 37. Such shifting permits the shaft 10 and the bearing structure to shift relatively to the housing in cases where it is necessary to shift the axis of the shaft with respect to the housing axis.

In operation, the collar 13 is confined between two sets of bearing segments which operate to provide tapered films of lubricant between the segments and the bearing faces on the collar. Rotation of the collar 13 relatively to the elements 14 and 15 provides a pumping action which causes the lubricant to be drawn upwardly in the groove 33. The lubricant flows from the groove into the passages 27 so that an ample supply of lubricant is provided for the segments. In addition, lubricant enters the passages 43 to supply the grooves 44 and lubricate the bearings 21 and 22 with respect to the shaft 10 and the pin 11, respectively. The collar 13 is isolated from the lubricant in the spaces 39. This provides an arrangement wherein the large quantity of lubricant in the housing 37 remains substantially undisturbed, and prevents excessive agitation and foaming of the lubricant. Circumferential grooves 49 and 50 are provided in the bearings 21 and 22 to arrest flow of the lubricant axially of the shaft 10 and the sleeve 25. The end grooves 49 are provided with drain openings 51 which return lubricant accumulating therein back to the respective chambers 39. One end of the housing 37 is provided with a closure plug 51, and the other end of the housing is provided with an opening 52 through which the shaft 10 extends loosely. Any lubricant flowing beyond the groove 49 in the bearing 21 is accumulated in an annular passage 53 communicating with the opening 52, this passage being provided with a drain opening 54 for returning the lubricant back to the adjacent chamber 39.

The housing 37 is made in two sections 55 and 56, the sections being fixedly related by screws 57. A mounting flange 58 is fixed to the section 56 for connection with a suitable supporting foundation.

Figure 5 illustrates the webs 59 as being relatively thin and arranged radially to render the desired flexibility to the segments 16.

Figure 6:
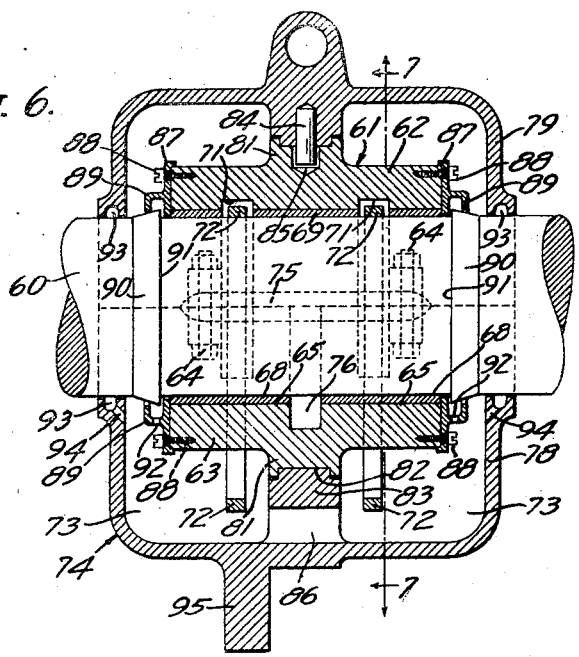
Figure 6 is an axial sectional view of a radial bearing.
Figure 7:
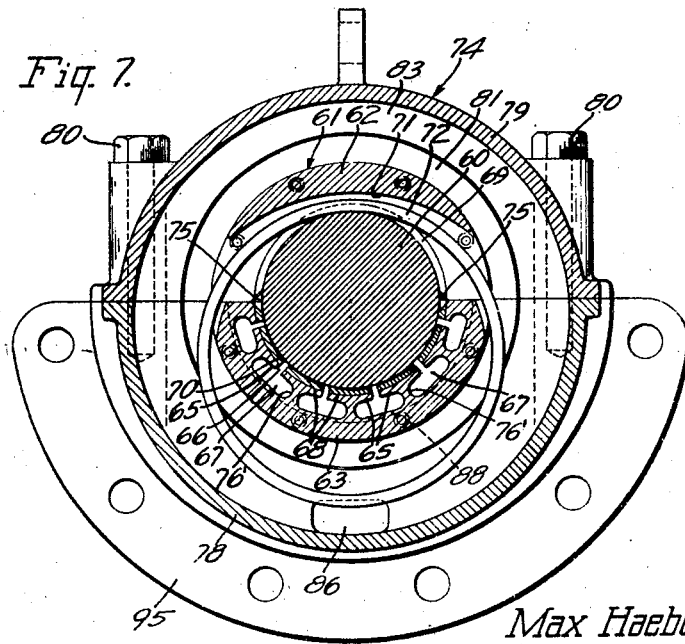
Figure 7 is a sectional view taken along the line 7—7 of Figure 6.

Figures 6 and 7 illustrate a radial bearing wherein a shaft or journal 60 is supported in a bearing member 61 comprising sections 62 and 63. These sections are fixedly related by bolts 64. The section 63 is provided with segments 65. These segments are separated at 66, and the spaces separating the segments communicate with passages or chamber 67 paralleling the axis of the bearing member 61. Antifriction liners 68 are attached to the respective segments 65 and have bearing engagement with the shaft 60. A bearing liner 69 is attached to the section 62 for engagement with the upper half of the shaft 60 extending through the bearing 61. Assuming clockwise rotation of the shaft 60 when viewing Figure 7, wedge shaped lubricant films are formed between the segment 65 and the shaft 60, as indicated by the clearance spaces 70. These spaces, as well as the wedge shaped clearances of Figure 3, are exaggerated in a considerable degree to illustrate the wedge contours of the lubricant films.

Grooves 71 are provided in the section 62 to loosely accommodate oil rings 72 which hang from the shaft 60. Both oil rings hang some distance beneath the section 63 to be partly submerged in lubricant contained in the chambers 73 of a housing 74 forming an enclosure for the bearing structure. Both sections 62 and 63 are cut away to provide two horizontal lubricant accumulating grooves 75 along diametrically opposite lines adjacent the shaft 60. Both grooves 71 communicate with the grooves 75, so that lubricant deposited upon the shaft 60 by the rings 72 flows into the grooves 75. Thus the passages 67 are supplied with an ample quantity of lubricant for maintaining the wedge shaped lubricant films between the segments and the shaft. The webs 76' are located centrally of their respective segments 65, and the arrangement of the grooves 75 assures ample quantities of lubricant for these segments regardless of direction of rotation of the shaft 60. The grooves 75 terminate short of the ends of the bearing member 61 so as to confine the lubricant within the grooves for delivery to the passage 67.

The section 63 is provided with circumferential groove 76 which communicates at its ends with the respective grooves 75. All the passages 67 communicate with the groove 76. Thus lubricant flows from the groove 75 and into the groove 76. The groove 76 constitutes a feeder for the passages 67, so that the latter passages fill with lubricant to provide an ample distribution for all the segments.

The housing 74 comprises sections 78 and 79 secured into a unitary structure by bolts 80. Means for supporting the bearing 61 inside the housing 74 comprises an annular rib 81 extending circumferentially of the bearing 61. This rib is provided with a circumferential groove 82 for the reception of an annular rib 83 fixed to the housing 74. Relative rotation between the ribs 81 and 83 is restrained by a pin 84 attached to the rib 83 and projecting into a recess 85 in the rib 81.

The bearing 61 is arranged eccentrically inside the housing 74 to increase the size of the chambers 73. A passage 86 in the rib 83 places the two chambers 73 in communication with each other.

End plates 87 are attached to the bearing 61 by bolts 88. Each plate 87 is provided with a lubricant-collecting flange 89 closely embracing the shaft 60. Lubricant deflecting flanges 90 are formed on the shaft 60 and lie partly inside the respective flanges 89 and closely adjacent the end plates 87. The faces 91 of the flanges 90 are arranged at right angles to the axis of the shaft 60 and the ribs are of tapered contour outwardly from the end plates 87. Any lubricant which escapes from the bearing 61 tends to collect in the flanges 89. Both flanges are provided with drain openings 92 for returning the lubricant to the chambers 73.

Should lubricant pass outwardly beyond the flanges 89, the housing 74 is provided with lubricant-collecting grooves 93, which grooves are provided with drain openings 94 leading into the chamber 73.

A mounting rib 95 is fixed to the section 78 for connection with a suitable foundation. In all forms of the bearing, the bearing enclosing housing is so designed as to constitute a reservoir for a relatively large quantity of lubricant. The lubricant in the reservoir remains relatively undisturbed, but the bearing structure is such as to maintain pools of lubricant about the segments. In no case do the segments dip directly into the pools of lubricant in the housing.

In the absence of lubricant between the segments and their journal member, the segments lie face to face with the co-acting bearing face of their journal member. Because of the flexible mounting of the segments, lubricant wedging between the segments and the journal member cause such displacement of the segments as to maintain tapered films of lubricant between the relatively moving parts. While the drawings illustrate the segments as being provided with bearing liners, such liners may be dispensed with in cases where the segments are formed entirely of material having good bearing qualities in itself.

What is claimed is:

1. In a bearing having a lubricant reservoir, a bearing body provided with a lubricant distributing passage, a journal means, bearing segments comprising portions of said bearing body and arranged to rotatably support said journal means, said segments being spaced one from the other to provide lubricant receiving passages, said bearing body being shaped to isolate said segments from said reservoir but said lubricant receiving passages having communication with said lubricant distributing passage, and lubricant carrying means actuated through rotation of said journal means for moving lubricant from said reservoir and into said lubricant distributing passage for delivery to said lubricant receiving passages, said lubricant carrying means comprising an oil ring suspended from said journal means and dipping into the lubricant in the reservoir.

2. In a bearing having a lubricant reservoir, a bearing body provided with a lubricant distributing passage, a journal means, bearing segments comprising portions of said bearing body and arranged to rotatably support said journal means, said segments being spaced one from the other to provide lubricant receiving passages, said bearing body being shaped to isolate said segments from said reservoir but said lubricant receiving passages having communication with said lubricant distributing passage, and lubricant carrying means actuated through rotation of said journal means for moving lubricant from said reservoir and into said lubricant distributing passage for delivery to said lubricant receiving passages, said lubricant carrying means comprising rings suspended from said journal means and dipping into the lubricant in the reservoir.

3. In a bearing having a lubricant reservoir, a bearing unit provided with lubricant distributing passages, a journal means, bearing segments comprising portions of said bearing unit and arranged to rotatably support said journal means, said segments being spaced one from the other to provide lubricant receiving passages opening to said journal means, said bearing unit being shaped to isolate said segments from said reservoir but said lubricant receiving passages having communication with said lubricant distributing passages, and rings suspended from said journal means and partially submerged in the lubricant in said reservoir for carrying lubricant to said journal means and into said lubricant distributing passages.

4. In a bearing, a housing shaped to provide a lubricant reservoir, a bearing unit mounted in said housing, a shaft rotatably supported in said bearing unit, said bearing unit being provided with horizontal lubricant distributing passages opening toward said shaft, and bearing segments comprising portions of said bearing unit arranged to rotatably support said shaft, said segments being spaced one from the other to provide lubricant receiving passages, said bearing unit being provided with a groove placing said lubricant distributing passages in communication with said lubricant receiving passages, and rings suspended from said shaft in planes extending transversely of said lubricant distributing passages and dipping into said reservoir to carry lubricant on to said shaft and into said lubricant distributing passages.

MAX HAEBERLEIN.

REFERENCES CITED

The following references are of record in the file of this patent:

UNITED STATES PATENTS

| Number | Name | Date |
| --- | --- | --- |
| 513,696 | Wood | Jan. 30, 1894 |
| 1,295,974 | Dron | Mar. 4, 1919 |
| 1,546,890 | Gilson | July 21, 1925 |
| 1,409,552 | Kingsbury et al. | Mar. 14, 1922 |
| 1,425,978 | Kingsbury | Aug. 15, 1922 |
| 1,735,315 | Fulpins | Nov. 12, 1929 |
| 1,760,904 | Howarth | June 3, 1930 |
| 2,054,219 | Howarth | Sept. 15, 1936 |
| 1,609,496 | Reed | Dec. 7, 1926 |
| 1,956,973 | Baum | May 1, 1934 |
| 2,217,200 | Fast | Oct. 8, 1940 |
| 1,712,277 | McIntyre | May 7, 1925 |
| 1,734,906 | Howarth | Nov. 5, 1929 |

FOREIGN PATENTS

| Number | Country | Date |
| --- | --- | --- |
| 319,066 | Germany | Mar. 1, 1920 |
| 605,097 | France | Feb. 9, 1926 |
| 125,510 | Great Britain | Apr. 17, 1919 |
| 341,605 | Germany | Oct. 5, 1921 |
| 371,964 | Germany | Mar. 24, 1923 |